Patented Nov. 29, 1938

2,138,192

UNITED STATES PATENT OFFICE 2,138,192

SYNTHETIC RUBBER COMPOSITION

Emil Ott, Wilmington, Del., assignor to Hercules Powder Company, Wilmington, Del., a corporation of Delaware No Drawing. Application January 31, 1936, Serial No. 61,759

11 Claims. (Cl. 106—22)

REISSUED
SEP 17 1940

My invention relates to a synthetic rubber composition and more specifically to a synthetic rubber composition comprising polymerized chloroprene and chlorinated paraffin.

Synthetic rubber compositions including polymerized chloroprene as a base, show considerable advantage over similar compositions including natural rubber as a base, in that they possess higher resistance to solvents, particularly gasoline and mineral oils, and show less loss of desirable physical properties on exposure to solvents. For this reason, such synthetic rubber compositions have found wide application in the manufacture of gasoline hose, gaskets and other articles which come into contact with solvents. Such compositions are, however, not entirely resistant to swelling in solvents and further improvement is desirable.

I have invented a synthetic rubber composition which is highly resistant to the swelling action of gasoline and mineral oils, which comprises essentially polymerized chloroprene and a chlorinated paraffin wax having a chlorine content sufficiently high to render the said wax insoluble in gasoline.

The chlorinated paraffin wax used in the compositions, in accordance with my invention, will desirably have a chlorine content of not less than about 52% by weight, and may have as high a chlorine content as can be obtained. The practical upper limit appears to be about 62% by weight. The chlorine content of the chlorinated paraffin wax, used in accordance with this invention will, then, be within the range of about 52% to about 62% by weight. The chlorinated paraffin wax will, desirably, be stabilized by treatment with aqueous alkaline solutions, as more completely described in the copending application for United States Letters Patent of William T. Bishop, Serial No. 15,505, filed April 9, 1935, and/or stabilized by the addition of organic bases, as more completely described in my copending application filed jointly with William T. Bishop, Serial No. 19,468, filed May 2, 1935.

The polymerized chloroprene used in the composition, in accordance with my invention is the unvulcanized, chloroprene polymer having physical properties very similar to those of natural rubber. Such polymerized chroroprene is known to the art by the trade name of Duprene.

In addition to chlorinated paraffin and polymerized chloroprene, the compositions in accordance with my invention may include vulcanizing agents, for example, metallic oxides, as, magnesium oxide, zinc oxide, lead oxide, abietic acid containing compounds, as, wood rosin, pine tar, etc., vulcanization accelerators, sulfur, etc., they may contain rubber anti-oxidants, such as a phenyl-naphthylamine, for example, phenyl-alpha-naphthylamine (Neozone A), phenyl-beta naphthylamine (Neozone D), etc.; they may contain reinforcing pigments, such as, carbon blacks, clay, blanc fixe, etc.; they may contain fillers and/or diluents, such as "whiting," barytes, asbestine, factice, rubber, various synthetic plastics, glue, etc.; they may contain softeners, such as, paraffin wax, fatty acids, oils, tars, cumar resins, etc.; and they may contain deodorants, such as terpene compounds, etc.

The composition in accordance with my invention may contain chlorinated paraffin wax in amount within the range of about 1% to about 100% by weight based on the amount of polymerized chloroprene present, and will preferably contain chlorinated paraffin wax in amount within the range of about 30% to about 70% by weight of the polymerized chloroprene present.

The chlorinated paraffin wax-polymerized chloroprene composition may be vulcanized by heat alone with no additional ingredients present. It will be found, however, that the properties of this composition will be enhanced by compounding it with other ingredients. Thus for example, wood rosin, sulfur, metallic oxides, etc. may be advantageously compounded into the composition before vulcanization. The addition of wood rosin, abietic acid or pine tar will be found to be highly desirable.

The wood rosin or abietic acid may be added in amounts up to about 5% of the weight of the polymerized chloroprene present, and the pine tar may be added in amounts up to about 10%. When using pine tar in amounts above 5% by weight of the chloroprene present, it is usually necessary to reduce the amount of softener contained in the composition, as the pine tar has a softening action on the composition.

Sulfur may be added in amounts up to about 3% by weight of the polymerized chloroprene present. When added in excessive amounts the sulfur tends to "bloom" out of the composition. The exact amount that may be added depends on the various ingredients present in the composition. The metallic oxide added to the composition may be, for example, magnesia, zinc oxide, lead oxide, or combinations of these materials. Such oxides are valuable additions to the composition in that they improve the physical properties of the composition and, in addition, act as acceptors for any hydrochloric acid which may be evolved from either the chlorinated paraffin wax or the polymerized chloroprene. Metallic oxides may be added to the composition in amounts up to about 10% based on the total weight of chlorinated paraffin and polymerized chloroprene present.

An organic vulcanization accelerator may, if desired, be added to the composition. Such addition is not essential. The resistance of the composition to aging is improved by the addition of anti-oxydants, such as, for example, phenyl-alpha-naphthylamine and phenyl-beta-naphthylamine in amounts within the range of about 1% to about 5% by weight of the polymerized chloroprene in the composition. Carbon blacks, such as, for example, channel carbon black or "soft blacks" may be advantageously added to the composition. Such carbon blacks may be added in amounts up to 100-200% by weight of the total weight of chlorinated paraffin wax and polymerized chloroprene, depending upon the exact carbon black used. Glue may be added in amounts up to about 25% by weight.

Various softeners, such as, for example, paraffin wax, fatty acids, oils, tars, waxes, cumarone resins, etc., may, if desired, be added to the composition. Such additions are usually not desirable, since they tend to decrease the resistance of the composition to gasoline and oils. Chlorinated paraffin wax acts as a softener for the composition, and any desired softness may be obtained by increasing the percentage of chlorinated paraffin contained in the composition, without decreasing the oil and gasoline resistance.

As examples of compositions, in accordance with this invention, the following may be cited:

*Example I*

|  | Parts |
|---|---|
| Polymerized chloroprene | 3 |
| Chlorinated paraffin wax (50% chlorine) | 1 |

*Example II*

|  | Parts |
|---|---|
| Polymerized chloroprene | 4 |
| Chlorinated paraffin wax (50% chlorine) | 1 |

The compositions according to the above examples may be dissolved in an aromatic hydrocarbon solvent, such as toluol, to form a cement which is highly resistant to gasoline and mineral oils.

The following examples are given as illustrations of compositions, in accordance with my invention, which are suitable for vulcanization.

|  | Example 3 | Example 4 |
|---|---|---|
|  | *Parts* | *Parts* |
| Polymerized chloroprene (Duprene) | 153.0 | 287 |
| Chlorinated paraffin wax (54% chlorine) | 75.0 | 140 |
| Carbon black (P-33) | 197.5 | 369 |
| Whiting | 153.0 | 287 |
| Zinc oxide | 15.3 | 28.7 |
| Pine tar | 10.2 | 19.1 |
| Cumarone-indene resin (Cumar P25) | 10.2 | 19.1 |
| Wood rosin (Color FF.) | 10.2 | 19.1 |
| Light calcined magnesia | 15.3 | 28.7 |
| Sulfur | 1.3 | 2.4 |
| Stearic acid | 2.5 | 4.8 |
| Phenyl-alpha-naphthylamine | 1.3 | 2.4 |

The compositions shown in these examples may be vulcanized following the procedure used by the prior art with similar compositions of polymerized chloroprene not containing chlorinated paraffin. Thus, for example, such compositions may be vulcanized by heating at a temperature within the range of about 250° F. to about 300° F. for a period of about 20 minutes to about 2 hours.

It will be understood that the details and examples hereinbefore set forth are illustrative only, and that the invention as herein broadly described and claimed is in no way limited thereby.

What I claim and desire to protect by United States Letters Patent is:

1. A synthetic rubber composition including polymerized chloroprene and a gasoline insoluble chlorinated paraffin wax, the said composition being characterized by high resistance to swelling in gasoline.

2. A synthetic rubber composition including polymerized chloroprene and a chlorinated paraffin wax having a chlorine content of not less than about 52% by weight, the said composition being characterized by high resistance to swelling in gasoline.

3. A synthetic rubber composition including polymerized chloroprene and a chlorinated paraffin wax having a chlorine content within the range of about 52% to about 62% by weight, the said composition being characterized by high resistance to swelling in gasoline.

4. A synthetic rubber composition including polymerized chloroprene, a vulcanizing agent, and chlorinated paraffin wax having a chlorine content of not less than about 52% by weight, the said composition being characterized by high resistance to swelling in gasoline.

5. A synthetic rubber composition including polymerized chloroprene, a metallic oxide, and chlorinated paraffin wax having a chlorine content of not less than about 52% by weight, the said composition being characterized by high resistance to swelling in gasoline.

6. A synthetic rubber composition including polymerized chloroprene, magnesium oxide, and chlorinated paraffin having a chlorine content of not less than about 52%, the said composition being characterized by high resistance to swelling in gasoline.

7. A synthetic rubber composition including polymerized chloroprene, an anti-oxydant, and chlorinated paraffin wax having a chlorine content of not less than about 52% by weight, the said composition being characterized by high resistance to swelling in gasoline.

8. A synthetic rubber composition including polymerized chloroprene, a phenyl-naphthylamine, and chlorinated paraffin having a chlorine content of not less than about 52%, the said composition being characterized by high resistance to swelling in gasoline.

9. A synthetic rubber composition including polymerized chloroprene, phenyl-alpha-naphthylamine, and chlorinated paraffin having a chlorine content of not less than about 52%, the said composition being characterized by high resistance to swelling in gasoline.

10. A synthetic rubber composition including polymerized chloroprene, a reinforcing pigment and chlorinated paraffin having a chlorine content of not less than about 52%, the said composition being characterized by high resistance to swelling in gasoline.

11. A synthetic rubber composition including polymerized chloroprene, a carbon black, and chlorinated paraffin having a chlorine content of not less than about 52%, the said composition being characterized by high resistance to swelling in gasoline.

EMIL OTT.